No. 785,739. PATENTED MAR. 28, 1905.
A. KETTNICH.
TAPER GAGE.
APPLICATION FILED AUG. 15, 1904.
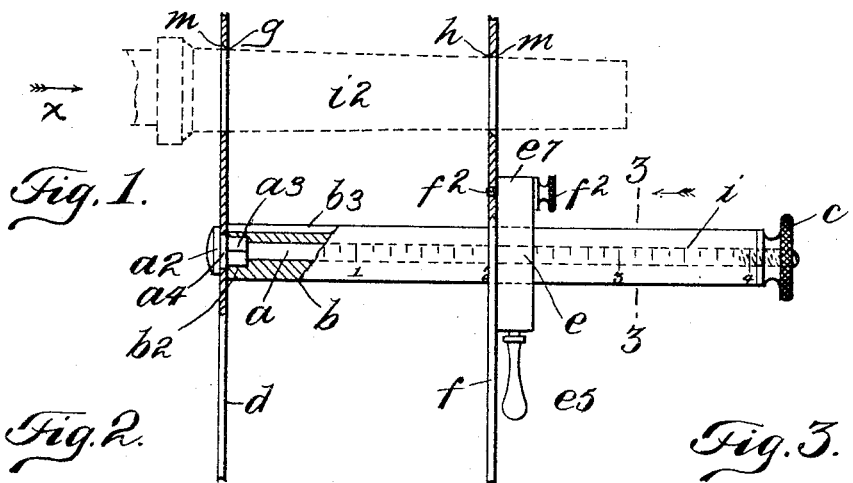
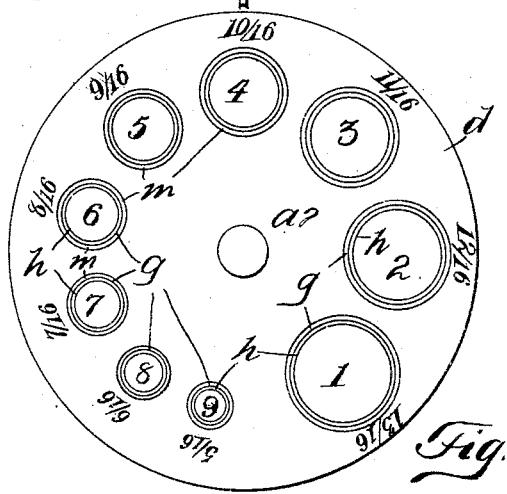
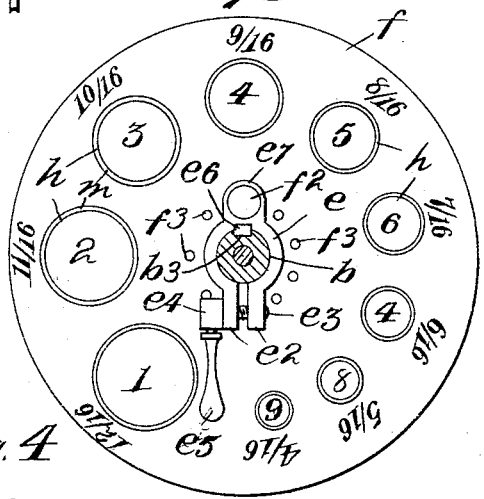
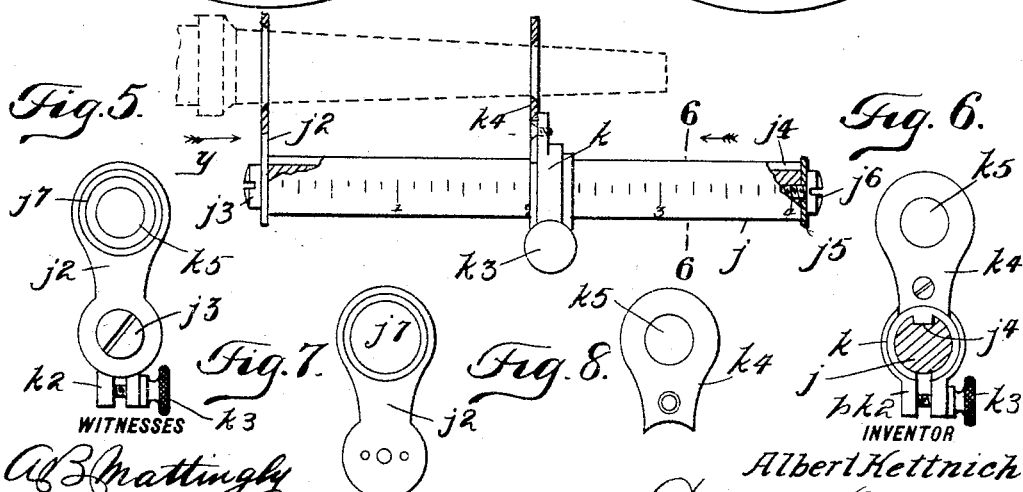
WITNESSES
A. B. Mattingly
J. O. Lassen
INVENTOR
Albert Kettnich
BY Edgar Tate & Co
ATTORNEYS No. 785,739. Patented March 28, 1905.

UNITED STATES PATENT OFFICE.

ALBERT KETTNICH, OF NEW YORK, N. Y.

TAPER-GAGE.

SPECIFICATION forming part of Letters Patent No. 785,739, dated March 28, 1905.

Application filed August 15, 1904. Serial No. 220,713.

*To all whom it may concern:*

Be it known that I, ALBERT KETTNICH, a subject of the Emperor of Germany, residing at New York, in the county of New York and State of New York, have invented certain new and useful Improvements in Taper-Gages, of which the following is a specification, such as will enable those skilled in the art to which it appertains to make and use the same.

This invention relates to gages for use in tapering spindles, pins, bolts, and other articles of this class; and the object thereof is to provide a scale of this class which is simple in construction and operation and comparatively inexpensive and which may be used wherever articles of this class are required.

The invention is fully disclosed in the following specification, of which the accompanying drawings form a part, in which the separate parts of my improvement are designated by suitable reference characters in each of the views, and in which—

Figure 1 is a sectional side view of the preferred form of my improved taper-gage; Fig. 2, an end view looking in the direction of the arrow $x$ of Fig. 1; Fig. 3, a section on the line 3 3 of Fig. 1; Fig. 4, a view similar to Fig. 1, showing a modification; Fig. 5, an end view of the device as shown in Fig. 4 and looking in the direction of the arrow $v$; Fig. 6, a section on the line 6 6 of Fig. 4; Fig. 7, a side view of one of the parts used in the construction of the device as shown in Fig. 4, and Fig. 8 a detail of one of the parts shown in Fig. 5.

In the practice of my invention as shown in Figs. 1 to 3, inclusive, I provide a shaft $a$, one end of which is provided with a head $a^2$, having an angular hub $a^3$, and mounted on the shaft $a$ is a sleeve $b$, the end of which adjacent to the head $a^2$ of the shaft $a$ is provided with an angular recess $b^2$, adapted to receive the hub $a^3$ of the head $a^2$, whereby the turning of the shaft in the sleeve $b$ is prevented. The shaft $a$ extends entirely through the sleeve $b$, and the end thereof opposite the head $a^2$ is screw-threaded and provided with a milled thumb-nut or similar device, whereby the sleeve $b$ may be clamped on the shaft $a$.

The sleeve $b$ is provided in one side thereof with a longitudinal groove $b^3$, and the head $a^2$ of the shaft $a$ is provided with a supplemental hub $a^4$, on which is mounted a rotatable disk $d$, which may be rigidly held in any desired position by screwing the nut $c$ onto the shaft $a$, so as to force the sleeve $b$ against the disk $d$.

Mounted on the sleeve $b$ and adapted to slide thereon is a clamp-collar $e$, having jaws $e^2$, through which is passed a screw $e^3$, provided with a head $e^4$, having a handle $e^5$, by which said screw may be turned, and the collar $e$ is provided with a tongue $e^6$, which fits in and is movable in the groove $b^3$ in the sleeve $b$. The clamp-collar $e$ is provided opposite the jaws $e^2$ with a lug or projection $e^7$, and mounted on the sleeve $b$ is a disk $f$, similar in form and diameter to the disk $d$, and the disk $f$ is connected with the collar $e$ by a screw $f^2$, passed through the lug or projection $e^7$, and said disk $f$ is provided around the center thereof with a plurality of holes $f^3$, whereby the disk $f$ may be turned on the sleeve $b$ and locked to the collar $e$ at any desired point.

The disk $d$ is provided with a plurality of holes $g$, arranged in a circle around the center thereof, nine of these holes being shown in the drawings, and these holes in the form of construction shown are numbered from one to nine and range from thirteen-sixteenths in the form of construction shown to five-sixteenths of an inch in diameter.

The disk $f$ is provided with a plurality of holes $h$, which are also nine in number and which are also numbered from one to nine and which range in size in the form of construction shown from twelve-sixteenths of an inch to four-sixteenths of an inch in diameter.

The sleeve $b$ is provided with a scale $i$, which represents inches and fractions thereof, and in Fig. 1 I have indicated in dotted lines at $i^2$ a tapered spindle, and the operation of this form of construction will be readily understood from the foregoing description when taken in connection with the accompanying drawings and the following statement thereof. If it is desired that the spindle $i^2$ be tapered one-sixteenth of an inch in two inches, the disk $f$ is set at the point shown in Fig. 1 and the spindle is passed through any of the corresponding openings in said disks, the diameter of the opening in the disk $d$ being one-sixteenth greater than that in the disk $f$. If a taper of one-quarter of an inch in two inches is required for the spindle $i^2$, then the said spindle is passed through one of the openings in the disk $d$ and through an opening in the disk $f$ which is four-sixteenths less in diameter than that in the disk $d$ through which the spindle is passed, and in order to do this it will be understood that the disk $f$ must be turned on the sleeve $b$, and it will also be understood that any desired taper for any length of spindle may be fixed in the same manner, the spindle being turned down in a lathe until the required size is produced.

In Figs. 4 to 8, inclusive, I have shown a modification in which I employ a tube or cylinder $j$, to one end of which is secured a radial arm $j^2$, this connection being made by a screw $j^3$ or in any desired manner, and the tube or cylinder $j$ is provided in one side with a longitudinal slot $j^4$, closed by a disk $j^5$, held in place by a screw $j^6$, and mounted on the tube or cylinder $j$ is a split collar or clamp $k$, provided with jaws $k^2$, through which is passed a set-screw $k^3$, and in practice a radial arm $k^4$ is connected with the split collar or clamp $k$ and provided with a circular opening $k^5$. The arm $k^4$ is shown detached in Fig. 8, and the arm $j^2$ is shown detached in Fig. 7, and the arm $j^2$ is provided with a hole $j^7$ and the arm $k^4$ with a hole $k^5$. In this form of construction the arms $j^2$ and $k^4$ correspond with the disks $g$ and $f$ in the form of construction shown in Figs. 1 to 3, and in practice a number of the arms $j^2$ and the corresponding number of the arms $k^4$ are provided and the holes $j^7$ and $k^5$ in the separate arms $j^2$ and $k^4$ are made of different sizes, so that the different arms $j^2$ and $k^4$ will afford the same facilities for measuring the taper of a spindle as the holes $g$ and $h$ in the disks $d$ and $f$. It will be observed that the holes $g$ and $h$ in the disks $d$ and $f$ are beveled or flared on the outer sides of said disks, as shown at $m$ in Fig. 1, and in practice the holes $j^7$ and $k^5$ in the arms $j^2$ and $k^4$ are similarly formed, this construction serving to facilitate the exact adjustment of the parts in the operation of the device. It will also be observed that the parts $j$ and $b$ are both cylindrical in form, and in each form of construction they serve as a handle for the device.

Having fully described my invention, what I claim as new, and desire to secure by Letters Patent, is—

1. A taper-gage, comprising a handle member having a scale, and two transversely-arranged members connected therewith, one of which is adjustable toward and from the other, said transversely-arranged members being provided with holes of different sizes, substantially as shown and described.

2. A taper-gage, comprising a handle member having a scale, and two disks mounted thereon one of which is adjustable toward and from the other and also rotatable on the handle member, said disks being provided with circularly-arranged holes of different sizes, substantially as shown and described.

3. A gage, comprising a handle member, having a scale thereon, and two disks connected therewith at right angles thereto, and one of which is adjustable toward and from the other and adapted to be turned on the handle member, each of said disks being provided with a series of circularly-arranged holes, the holes in one disk being smaller than those in the other and said holes in each series decreasing in size corresponding to a predetermined scale, substantially as shown and described.

In testimony that I claim the foregoing as my invention I have signed my name, in presence of the subscribing witnesses, this 1st day of June, 1904.

ALBERT KETTNICH.

Witnesses:
   F. A. STEWART,
   C. E. MULREANY.